United States Patent [19]

Urban et al.

[11] 4,275,109

[45] Jun. 23, 1981

[54] SHEET-LIKE INSULATION

[75] Inventors: Raymond C. Urban, Ballston Lake; Robert W. Quinlan, Schenectady, both of N.Y.

[73] Assignee: General Electric Company, Schenectady, N.Y.

[21] Appl. No.: 68,142

[22] Filed: Aug. 20, 1979

[51] Int. Cl.³ .................. B32B 7/00; B32B 27/04; B32B 27/22
[52] U.S. Cl. .................................. 428/273; 428/480
[58] Field of Search ........... 260/31.8 XA; 174/120 C, 174/120 SR, 120 R, 122 G, 122 C, 124 G, 124 GC; 428/251, 268, 273, 290, 480; 310/45, 215; 336/205, 206

[56] References Cited

U.S. PATENT DOCUMENTS

| | | | |
|---|---|---|---|
| 2,706,162 | 4/1955 | Brown et al. | 428/480 |
| 2,861,910 | 11/1958 | Johnston et al. | 428/251 |
| 2,920,054 | 1/1960 | Walus | 260/31.8 |
| 2,936,296 | 5/1960 | Precopio et al. | 310/215 |
| 3,974,314 | 8/1976 | Fuchs | 428/251 |
| 4,128,777 | 12/1978 | Zgraggen | 428/273 |

*Primary Examiner*—William J. Van Balen
*Attorney, Agent, or Firm*—Morgan, Finnegan, Pine, Foley & Lee

[57] ABSTRACT

An improved thermally conductive insulation for transformers comprises sheet-like forms of woven glass fabric saturated with a lightly plasticized alkyd-type resin.

13 Claims, No Drawings

SHEET-LIKE INSULATION

The present invention relates to improved fabrics for layer and barrier insulation applications in dry type transformers. More particularly, it relates to glass fabrics varnished with lightly plasticized alkyd-type resins.

BACKGROUND OF THE INVENTION

Dry type transformers are widely used, e.g., in the forms of high voltage distribution transformers, power supply transformers, welder transformers, mine transformers, and the like. Such transformers are constructed with sheet-like layer and barrier insulation. In the past, special papers, such as cyanoethylated kraft wood pulp, have been used as transformer insulation, because of their good resistance to thermal degradation and improved thermal stability. More recently, high temperature resistant polymer fibers, e.g., the polyaramids, have been made into papers for this purpose, e.g., the NOMEX paper available from DuPont and Co.

Transformers of the above-mentioned types have a natural tendency to show a temperature rise during operation. For example, measurements of internal temperatures can show an increase from room temperature to about 180°–200° C. after 4.5 hours of continuous operation if polyaramid paper is used. This puts design limits on size and has an effect on useful life, since it is a rule-of-thumb that a 10° C. rise in operating temperature cuts transformer life by 50%.

It is clearly desirable to provide a simple means to reduce energy waste without changing the design of the transformer, and to lengthen its life. Such an object is achieved by the present invention.

By simply replacing the present insulation in dry type transformers with woven glass cloth saturated with a lightly-plasticized alkyd-type resin, the transformer can be upgraded in rating without increasing its size. Or the transformer can be redesigned to a smaller size without lowering its rating. Reductions in size will also result in significant savings in the cost of steel and copper.

It is believed that the new insulation is superior because of its vastly higher thermal conductivity in comparison with conventional materials. This permits the transformer to run cooler. There is no tendency to liberate hydrogen cyanide through combustion as is seen with some of the conventional materials. And because of its thermal conductivity, heat will be led away from insulating areas reducing chances of hot spots and runaway conditions.

The insulation of this invention can be used alone to build cool running dry type transformers, or it can be used with approved solvent-containing or solventless saturating resins of the polyester or epoxy type for superior insulation properties. These latter resins can also serve to waterproof and encapsulate the system through potting, dipping or vacuum pressure impregnation processes. Cure time is usually 2–4 hours at 150° C. depending on the size of the unit treated.

In otherwise identical transformers, the insulation of the present invention will achieve an operating temperature differential of as much as 33° C. lower than the commonly used materials.

DESCRIPTION OF THE PRESENT INVENTION

According to the present invention, there is provided sheet-like insulation adapted for use in cooler-running dry type transformers, the insulation comprising woven glass fabric impregnated with lightly plasticized alkyd-type resin.

The characteristic mechanical strength of the insulation of this invention is uniquely suitable for the manufacture of transformers. It has a high degree of cut-through strength that provides flexibility needed for various transformer winding configurations. Another application advantage is its "see through" characteristic that makes stay back measurement easy.

Suitable woven glass cloths are available commercially. The varnish coating is applied by conventional means, e.g., by coating on a tower to the desired thickness. Thickness can vary in the range of 0.003 to 0.050 inches, but preferably will be in the range of 0.005 to 0.010 inches.

Those skilled in this art will be familiar with alkyd-type insulating varnishes. These can be made in known ways, suitable such varnishes are commercially available, and preferred such varnishes will be exemplified hereinafter.

In general, the alkyd-resin will comprise the reaction product of a polyhydric alcohol or mixture thereof and a dibasic acid or mixture. As examples of the polyhydric alcohol can be mentioned glycerine, trimethylolpropane, pentaerythritol, alone, or mixed, e.g., with ethylene- or propylene glycol. Dibasic acids can comprise ortho-phthalic, isophthalic, and terephthalic, etc., acids. Preferably glycerine and isophthalic acid will be used.

Those skilled in this art are also familiar with the use of oils to modify alkyd resins; e.g., linseed oil, tung oil, and the like, are polymerized with the other ingredients to build in improved properties. In preferred embodiments, the alkyd resin will be oil-modified. In especially preferred embodiments, the oil will be linseed oil.

Also known is the use of non-reactive plasticizers or flexibilizers in oil-modified alkyd resins. Those generally cause a lowering of stiffness and comprise high-boiling compatible organic liquids such as phthalate esters, e.g., di-octyl phthalate, or sebacic acid esters, but preferably non-reactive polyesters.

It is critical to the present invention to use an alkyd resin which is plasticized, but only lightly plasticized. If too much plasticizer is used, the insulation will be too limp to be used on transformer winding machines. Conversely, too little plasticization will cause the insulation not to be flexible enough for easy winding.

The alkyd resin must be carefully formulated to be lightly plasticized. It is most convenient to prepare two alkyd-formulations, one which is highly plasticized and one which is not plasticized and to blend them until a coated fabric with the desired degree of flexibility is obtained, e.g., measured in a standard test, e.g., the Gurley stiffness test known in this industry.

The preferred plasticizer is a polyester terminated with groups derived from a monohydric alcohol. This can be added in controlled amounts to the alkyd resin formulation, e.g., about 4 to 10 parts by weight per 100 parts of resin solids. If the higher amount is used, then a straight alkyd, i.e., without plasticizer, can be blended in to cut the flexibility to the desired level.

The alkyd varnishes, e.g., in xylene solvent, are applied to the glass cloth in a conventional tower to the desired thickness. One pass is sufficient to coat with no pinholes and no dripmarks after running at 5 ft./min. and a three-zone temperature profile of 90°–110° C.; 200°–250° C.; and 200°–250° C.

Rolls 250 yards long are suitable for standard production. The sheets can be as wide as the widest glass cloth that can be treated, down to ⅛ inch in width.

DESCRIPTION OF THE PREFERRED EMBODIMENTS

The following examples show the preparation of articles of this invention. They are illustrative, and the claims are not to be construed as limited thereto.

EXAMPLE 1

A first alkyd type varnish is prepared by heating to 225° C. over 16 hours, a mixture comprising (by weight):

| Ingredients | Parts |
| --- | --- |
| Glycerine | 11.2 |
| Linseed Oil (refined) | 17.2 |
| Isophthalic Acid | 18.7 |
| Lithium carbonate (catalyst) | 0.005 |

After esterification is complete, xylene solvent, 43.3 parts by weight is added to produce a clear varnish.

A non-reactive monofunctional alcohol chain-stopped polyester plasticizer is prepared by heating to 240° C. over 16 hours, a mixture comprising (by weight):

| Ingredients | Parts |
| --- | --- |
| Propylene Glycol | 30.0 |
| 2-Ethylhexanol | 16.0 |
| Adipic Acid | 42.0 |
| Maleic Anhydride | 11.0 |
| Triphenyl Phosphite (catalyst) | 0.3 |

After esterification is complete, and the resin is cooled, 0.001 parts by weight of hydroquinone is added as a stabilizer.

A second alkyd type varnish is prepared following the procedure set forth for the first above, but also adding 9.6 parts by weight of the chain-stopped polyester, as described.

A saturating varnish mixture is prepared by mixing equal parts of the first alkyd type varnish and the second, plasticized alkyd type. Mixing is thorough and the resin in the container is kept free of gels and solid particles. A roll of glass cloth (Greige) is coated on a tower with the mixed varnish to a 0.010 inch thickness. The coat is made in one pass at a speed of 5 ft./min. and three zone temperatures of 100° C. 240° C., 240° C. and a gap of 22 mil. Using 0.25 lb./sq.yd. glass and a varnish loading of 0.70 lb./sq.yd., the yield of insulation is 0.60 lbs./sq.yd. The Gurley Avg. stiffness is 950 g-W and 890 g-F.

EXAMPLE 2

The coating procedure of Example 1 is repeated and the coating is applied to produce a 0.005 inch thickness. The coat is made in one pass at a speed of 5 ft./min. and three zone temperatures of 100° C., 225° C. and 225° C. and a gap of 9 mil. Using 0.18 lb./sq.yd. glass, and a varnish loading of 0.34 lb./sq.yd., the yield of insulation is 0.36 lbs./sq.yd. The Gurley Avg. stiffness is 310 g-W and 130 g-F.

Modifications can be made in the above formulations. For example, just prior to coating, 3% sand can be added to the mixed varnishes to enhance friction.

Insulation prepared by the foregoing methods is adaptable to the preparation of dry type transformers in conventional manufacturing techniques. Varnish treatment by dipping or vacuum pressure impregnation will result in a transformer with lower operating temperature. The insulation is compatible with most insulating varnishes, such as epoxies, polyesters, phenolics and other synthetic resins. They are also compatible with silicones that have metallic catalysts. They are not preferred for use with silicones containing basic catalysts, reactive diluents that reduce viscosity, vinyl chloride resin, chlorinated rubber, urea varnishes or melamine varnishes.

For purposes of comparison, dry-type transformers of the same kind are built. These are 500 volt amp units with a 40-to-1 turns ratio, primary 115 volts, secondary 4000 volts. To measure operating temperature, two thermocouples are placed in each transformer—one on the hotspot and one on the outer layer of the secondary coil. Pairs of transformers are then connected back-to-back so they will be loaded equally with current.

In the control transformers, the insulation comprises polyaramid paper vacuum pressure impregnated with a solventless insulating resin. In the transformers made with the sheets of this invention, the insulation comprises lightly plasticized alkyd type resin varnished glass cloth vacuum pressure impregnated with the same solventless insulating resin used above. The control after 4.5 hrs. has an operating temperature of 179° C. The transformer with insulation according to this invention has an operating temperature after 4.5 hrs. of 146° C., a full 33° C. cooler. In every instance, the insulation is void-free.

The foregoing demonstrates that the sheet-like articles according to this invention are economical and effective as a layer and a barrier insulation material in dry type transformers.

The detailed description herein will suggest many variations obvious to those of ordinary skill in this art. All such obvious variations are within the full intended scope of the appended claims.

We claim:

1. A sheet-like insulation adapted for use in cooler-running dry type transformers, said insulation comprising woven glass fabric impregnated with a lightly plasticized alkyd-type resin, wherein the plasticizer is a non-reactive plasticizer.

2. Insulation as defined in claim 1 having an overall thickness in the range of from 0.003 to 0.050 inches.

3. Insulation as defined in claim 2 having an overall thickness in the range of from 0.005 to 0.010 inches.

4. Insulation as defined in claim 1 wherein said alkyd-type resin comprises the reaction product of a polyhydric alcohol and a dibasic acid.

5. Insulation as defined in claim 4 wherein said polyhydric alcohol is glycerine, and said dibasic acid is isophthalic acid.

6. Insulation as defined in claim 1 wherein said alkyd-type resin is an oil-modified alkyd resin.

7. Insulation as defined in claim 6 wherein said oil is linseed oil.

8. Insulation as defined in claim 1 wherein the plasticizer is a non-reactive polyester.

9. Insulation as defined in claim 8 wherein said polyester is terminated with groups derived from a monohydric alcohol.

10. Insulation as defined in claim 9 wherein said polyester comprises the reaction product of propylene glycol, adipic acid, and maleic anhydride, and is terminated with groups derived from 2-ethylhexanol.

11. A substantially void-free insulation composite having superior thermal conductivity comprising a plurality of layers of insulation, each layer comprising woven glass fabric impregnated with a lightly plasticized alkyd-type resin, and an insulating varnish, wherein the plasticizer is a non-reactive plasticizer.

12. A sheet-like insulation adapted for use in cooler-running dry type transformers, said insulation comprising woven glass fabric impregnated with a lightly plasticized alkyd-type resin, wherein the plasticizer is a non-reactive polyester terminated with groups derived from a monohydric alcohol.

13. A sheet-like insulation adapted for use in cooler-running dry type transformers, said insulation comprising woven glass fabric impregnated with a lightly plasticized alkyd-type resin, wherein the plasticizer is a non-reactive polyester comprising the reaction product of propylene glycol, adipic acid and maleic anhydride, and is terminated with groups derived from 2-ethylhexanol.

* * * * *